United States Patent
Tang

(10) Patent No.: US 11,284,319 B2
(45) Date of Patent: Mar. 22, 2022

(54) METHOD FOR ACTIVATING AND DEACTIVATING CELL, TERMINAL EQUIPMENT AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 222 days.

(21) Appl. No.: 16/625,607

(22) PCT Filed: Sep. 27, 2017

(86) PCT No.: PCT/CN2017/103756
§ 371 (c)(1),
(2) Date: Dec. 20, 2019

(87) PCT Pub. No.: WO2019/061101
PCT Pub. Date: Apr. 4, 2019

(65) Prior Publication Data
US 2021/0337444 A1    Oct. 28, 2021

(51) Int. Cl.
*H04W 36/04* (2009.01)
*H04L 5/00* (2006.01)
*H04W 72/04* (2009.01)

(52) U.S. Cl.
CPC .......... *H04W 36/04* (2013.01); *H04L 5/0064* (2013.01); *H04L 5/0098* (2013.01); *H04W 72/0453* (2013.01)

(58) Field of Classification Search
None
See application file for complete search history.

(56) References Cited

U.S. PATENT DOCUMENTS

| 2013/0148535 A1 | 6/2013 | Baghel |
| 2014/0177557 A1 | 6/2014 | Charbit et al. |

(Continued)

FOREIGN PATENT DOCUMENTS

| CN | 102196596 A | 9/2011 |
| CN | 103313375 A | 9/2013 |

(Continued)

OTHER PUBLICATIONS

VIVO: "Discussion on bandwidth part operation", 3GPP Draft; R2-1708507 Discussion on Bandwidth Part Operation, 3rd Generation Partnership Project (3GPP), Mobilecompetence Centre; 650, Route Des Lucioles; F-06921 Sophia-Antipolis Cedex France vol. RAN WG2, no. Berlin, Germany; Aug. 21, 2017-Aug. 25, 2017 Aug. 20, 2017 (Aug. 20, 2017), XP051318362, Retrieved from the Internet: URL: http://www.3gpp. org/ftp/Meetings 3GPP SYNC/RAN2/Docs/[retrieved on Aug. 20, 2017] * Proposal 4*.

(Continued)

*Primary Examiner* — Saba Tsegaye
(74) *Attorney, Agent, or Firm* — Ladas & Parry, LLP

(57) ABSTRACT

Disclosed in the present invention are a method for activating and deactivating cell, a terminal equipment and computer storage medium, wherein the method comprises: on the basis of an instruction for activating the target band width part (BWP), activating an auxiliary cell that corresponds to the target BWP; and/or on the basis of an instruction for deactivating the target BWP, deactivating the auxiliary cell that corresponds to the target BWP.

12 Claims, 2 Drawing Sheets

At least one corresponding BWP is configured for a secondary cell — 101

The secondary cell corresponding to a target BWP is activated based on an instruction for activating the target BWP; and/or, the secondary cell corresponding to the target BWP is deactivated based on an instruction for deactivating the target BWP — 102

(56) References Cited

U.S. PATENT DOCUMENTS

| | | | |
|---|---|---|---|
| 2016/0205686 A1 | 7/2016 | Kim et al. | |
| 2019/0053060 A1 | 2/2019 | Baghel et al. | |
| 2020/0244429 A1* | 7/2020 | Bao | H04L 5/0098 |
| 2021/0075581 A1* | 3/2021 | Takeda | H04W 72/042 |
| 2021/0076445 A1* | 3/2021 | Tsai | H04W 76/19 |

FOREIGN PATENT DOCUMENTS

| | | |
|---|---|---|
| CN | 103889027 A | 6/2014 |
| CN | 105992285 A | 10/2016 |
| EP | 3404981 A1 | 11/2018 |
| WO | 2012023839 A2 | 2/2012 |
| WO | 2013151915 A1 | 10/2013 |
| WO | 2016168478 A1 | 10/2016 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP Standard: Technical Specification 3GPP TS 36.321, 3rd Generation Partnership Project (3GPP), Mobile Competence Centre 650, Route Des Lucioles : F-06921Sophia-Anti Polis Cedex ; France, vol. RAN WG2, No. V14.4.0, Sep. 25, 2017 (Sep. 25, 2017), pp. 1-108, XP051337312, [Sep. 25, 2017].

Mediatek Inc: "Summary of Offline Discussion on Bandwidth Part Operation", 3GPP Draft; R1-1716832 Summary of Offline Discussion on BWP Operation R2, 3rd Generation Partnership Project (3GPP), Mobile Competence Centre; 650, Route Deslucioles; F-06921 Sophia-Antipolis CEDEXvol. RAN WG1, no. Nagoya, Japan; Sep. 18, 2017-Sep. 21, 2017 Sep. 20, 2017 (Sep. 20, 2017), XP051353894, Retrieved from Internet: URL: http://www.3gpp. org/ftp/tsg_ran/WG1 RL 1/TSGR1 AH/NR AH 1709/Docs/ [Sep. 9, 2020] * Nokia NSB *.

VIVO: "Discussion on the activation/deactivation of the bandwidth part", 3GPP Draft; R1-1712870 Discussion on the Activation Deactivation of the Bandwidth Part, 3rd Generation Partnership Project (3GPP), Mobile Competence Centre; 650, Route Des Lucioles; F-06921 Sophia-A vol. RAN WG1, no. Prague, Czech Republic; Aug. 21, 2017-Aug. 25, 2017 Aug. 20, 2017 (Aug. 20, 2017), XP051315682, Retrieved from the Internet: URL: http://www.3gpp.org/ftp/Meetings 3GPP SYNC/RAN1/Docs/ [ retrieved on Aug. 20, 2017] * Chapter 2.2 *.

Supplementary European Search Report in the European application No. 17927218.2, dated May 4, 2020.

English Translation of the Written Opinion of the International Search Authority in the international application No. PCT/CN2017/103756, dated Jun. 21, 2018.

Huawei, HiSilicon, "Overview of bandwidth part, CA, and DC operation including SRS switching", 3GPP TSG RAN WG1 Meeting NR#3, R1-1715425, Nagoya, Japan, Sep. 18-21, 2017.

LG Electronics, "Discussion on carrier aggregation and bandwidth parts", 3GPP TSG RAN WG1 Meeting NR#3 R1-1715892, Nagoya, Japan, Sep. 18-21, 2017.

First Office Action of the Chinese application No. 201780090006.4, dated Mar. 24, 2021.

Office Action of the Indian application No. 201917053987, dated Mar. 12, 2021.

International Search Report in the international application No. PCT/CN2017/103756, dated Jun. 21, 2018.

Written Opinion of the International Search Authority in the international application No. PCT/CN2017/103756, dated Jun. 21, 2018 and English translation provided by Google Translate.

* cited by examiner

METHOD FOR ACTIVATING AND DEACTIVATING CELL, TERMINAL EQUIPMENT AND COMPUTER STORAGE MEDIUM

CROSS-REFERENCE TO RELATED APPLICATION

The current application is the US national phase application of PCT Application No. PCT/CN2017/103756 filed on Sep. 27, 2017, the disclosure of which is incorporated herein by reference in its entirety.

TECHNICAL FIELD

The disclosure relates to the technical field of information processing, and particularly to a method for cell activation and deactivation, a terminal device and a computer storage medium.

BACKGROUND

The Bandwidth Part (BWP) is a concept in the frequency domain. In addition, there is made such a hypothesis in existing discussions that a terminal supports only one activated BWP at one time point. Activation refers to that the terminal is expected to receive signals, including (uplink/downlink) data transmission, system messages and the like, on a bandwidth specified by the BWP.

Moreover, in the existing discussions, a network is also allowed to send an instruction to switch between different BWPs configured for a terminal, namely to deactivate a present BWP and activate a new BWP. Activation instructions may be transmitted in various manners.

At present, in Long Term Evolution (LTE) Carrier Aggregation (CA), a secondary cell may be activated through the indication from a Media Access Control (MAC) Control Element (CE) and may be deactivated through the MAC CE and a configured timer. However, there may be such a problem that the terminal may still not work in the secondary cell if a BWP configured for the cell is not activated after the secondary cell is activated.

SUMMARY

To solve the above technical problem, embodiments of the disclosure provide a method for cell activation and deactivation, a terminal device and a computer storage medium.

The embodiments of the disclosure provide a method for cell activation and deactivation, which is applied to a terminal device, and the method includes at least one of the following operations.

A secondary cell corresponding to a target BWP is activated based on an instruction for activating the target BWP.

The secondary cell corresponding to the target BWP is deactivated based on an instruction for deactivating the target BWP.

According to an embodiment of the disclosure, the method may further include the following operation.

At least one corresponding BWP is configured for the secondary cell, the BWP including at least one downlink BWP.

According to an embodiment of the disclosure, before the operation that the secondary cell corresponding to the target BWP is activated, the method may further include the following operation.

It is determined, based on the instruction for activating the target BWP, whether to activate the secondary cell corresponding to the target BWP.

According to an embodiment of the disclosure, the operation that it is determined, based on the instruction for activating the target BWP, whether to activate the secondary cell corresponding to the target BWP may include the following operations.

It is determined, based on the instruction for activating the target BWP, whether the secondary cell corresponding to the target BWP is in an activated state.

If the secondary cell corresponding to the target BWP is not in the activated state, it is determined to activate the secondary cell and to activate the target BWP for the secondary cell.

According to an embodiment of the disclosure, before the operation that the secondary cell corresponding to the target BWP is deactivated, the method may further include the following operation.

It is determined, based on the instruction for deactivating the target BWP, whether to deactivate the secondary cell corresponding to the target BWP.

According to an embodiment of the disclosure, the operation that it is determined, based on the instruction for deactivating the target BWP, whether to deactivate the secondary cell corresponding to the target BWP may include the following operations.

When the instruction for deactivating the target BWP is received by the terminal device, it is determined whether there is a further BWP in the activated state for the secondary cell where the target BWP is located after the target BWP is deactivated.

If there is not the further BWP in the activated state, the secondary cell where the target BWP is located is deactivated, and if there is the further BWP in the activated state, the secondary cell is not deactivated.

The embodiments of the disclosure provide a terminal device, including a processing unit.

The processing unit is configured to perform at least one of: activating a secondary cell corresponding to a target BWP based on an instruction for activating the target BWP; or deactivating the secondary cell corresponding to the target BWP based on an instruction for deactivating the target BWP.

According to an embodiment of the disclosure, the terminal device may further include a configuration unit.

The configuration unit is configured to configure at least one corresponding BWP for the secondary cell, the BWP including at least one downlink BWP.

According to an embodiment of the disclosure, the processing unit may be configured to determine, based on the instruction for activating the target BWP, whether to activate the secondary cell corresponding to the target BWP.

According to an embodiment of the disclosure, the processing unit may be configured to: determine, based on the instruction for activating the target BWP, whether the secondary cell corresponding to the target BWP is in an activated state; and if the secondary cell corresponding to the target BWP is not in the activated state, determine to activate the secondary cell and to activate the target BWP for the secondary cell.

According to an embodiment of the disclosure, the processing unit may be configured to determine, based on the instruction for deactivating the target BWP, whether to deactivate the secondary cell corresponding to the target BWP.

According to an embodiment of the disclosure, the processing unit may be configured to: when the instruction for deactivating the target BWP is received by the terminal device, determine whether there is a further BWP in the activated state for the secondary cell where the target BWP is located after the target BWP is deactivated; and if there is not the further BWP in the activated state, deactivate the secondary cell where the target BWP is located, and if there is the further BWP in the activated state, not deactivate the secondary cell.

The embodiments of the disclosure also provide a terminal device including a processor and a memory storing a computer program that is executable on the processor. The processor is configured to execute the computer program to implement the steps of the abovementioned method.

The embodiments of the disclosure also provide a computer storage medium having stored thereon computer-executable instructions that, when being executed, implement the steps of the abovementioned method.

According to the technical solutions of the embodiments of the disclosure, the target BWP may be activated and/or deactivated to control whether to activate and/or deactivate the secondary cell where the target BWP is located. Therefore, it is possible to solve the problem that the terminal may still not work in the secondary cell if the BWP configured for the cell is not activated after the secondary cell is activated, and thus system processing efficiency is improved.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

First Embodiment

The embodiment of the disclosure provides a method for cell activation and deactivation, which is applied to a terminal device and includes the following operations.

A secondary cell corresponding to a target BWP is activated based on an instruction for activating the target BWP; and/or the secondary cell corresponding to the target BWP is deactivated based on an instruction for deactivating the target BWP.

Figure 1:
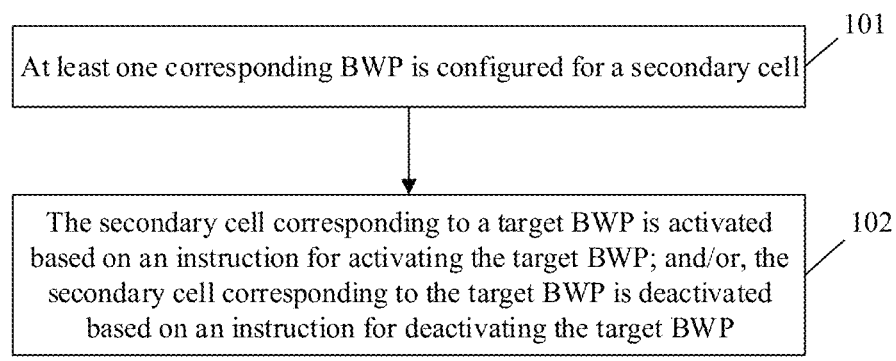
FIG. 1 is a flowchart of a method for cell activation and deactivation according to an embodiment of the disclosure.

Furthermore, based on the method, as illustrated in FIG. 1, the following processing is provided in the disclosure.

In 101, at least one corresponding BWP is configured for the secondary cell. The BWP includes at least one downlink BWP.

In 102, the secondary cell corresponding to a target BWP is activated based on the instruction for activating the target BWP; and/or the secondary cell corresponding to the target BWP is deactivated based on the instruction for deactivating the target BWP.

As to BWP, a system bandwidth supported in New Radio (NR) is far larger than a maximum system bandwidth of 20 MHz supported in LTE, for some terminals, not all system bandwidths can be supported because of limited capabilities thereof; and furthermore, scheduling efficiency needs to be improved, so that the concept of BWP is introduced in NR. In a Radio Resource Control (RRC) connected state, a network configures one or more BWPs for a terminal. Each BWP mainly includes three parameters including: Numerology, indicating a basic parameter set and indicating a Subcarrier Spacing (SCS); a center frequency point; and a width, less than or equal to a maximum system bandwidth.

In the embodiment of the disclosure, the terminal activates a certain configured secondary cell according to a received instruction for activating a certain BWP; and furthermore, the terminal may also determine to deactivate a certain configured secondary cell that has been activated according to a received instruction for deactivating a BWP.

Activating a certain BWP refers to activating a BWP configured on the configured secondary cell, namely multiple BWPs may be configured for the secondary cell, and the activated BWP is any BWP in the multiple configured BWPs.

Deactivating the BWP refers to deactivating the BWP that is configured for the configured secondary cell that has been activated.

Before the operation that the secondary cell corresponding to the target BWP is activated, the method further includes the following operation.

It is determined, based on the instruction for activating the target BWP, whether to activate the secondary cell corresponding to the target BWP.

Activation of the secondary cell corresponding to the BWP and deactivation of the secondary cell corresponding to the BWP will be described below respectively.

In a first case, it is determined, based on the instruction for activating the target BWP, whether to activate the secondary cell corresponding to the target BWP.

Specifically, the operation that it is determined, based on the instruction for activating the target BWP, whether to activate the secondary cell corresponding to the target BWP includes the following operations.

It is determined, based on the instruction for activating the target BWP, whether the secondary cell corresponding to the target BWP is in an activated state.

If the secondary cell corresponding to the target BWP is not in the activated state, it is determined to activate the secondary cell and to activate the target BWP for the secondary cell.

In other words, when the terminal device receives an instruction for activating any BWP configured on a certain secondary cell, if the secondary cell is not activated, the terminal activates the secondary cell; furthermore, any BWP on the secondary cell is also activated.

In a second case, it is determined, based on the instruction for deactivating the target BWP, whether to deactivate the secondary cell corresponding to the target BWP.

Specifically, the operation that it is determined, based on the instruction for deactivating the target BWP, whether to deactivate the secondary cell corresponding to the target BWP includes the following operations.

When the terminal receives the instruction for deactivating the target BWP, it is determined whether there is a further BWP in the activated state for the secondary cell where the target BWP is located after the target BWP is deactivated.

If there is not the further BWP in the activated state, the secondary cell where the target BWP is located is deactivated, and if there is the further BWP in the activated state, the secondary cell is not deactivated.

When the terminal device receives an instruction for activating a BWP on a certain secondary cell, if there is no configured BWP in the activated state for the secondary cell after the BWP is deactivated, the terminal deactivates the secondary cell;

and if there is any one or more configured BWPs in the activated state after the BWP is deactivated, the terminal will not deactivate the secondary cell.

In other words, the secondary cell may be deactivated only when there are no other BWPs in the activated state for the secondary cell, otherwise, the secondary cell is kept in the activated state.

As can be seen, with adoption of the above solution, the target BWP may be activated and/or deactivated to control whether to activate and/or deactivate the secondary cell where the target BWP is located. Therefore, it is possible to solve the problem that the terminal may still not work in the secondary cell if the BWP configured for the cell is not activated after the secondary cell is activated, and thus system processing efficiency is improved.

Second Embodiment

Figure 2:
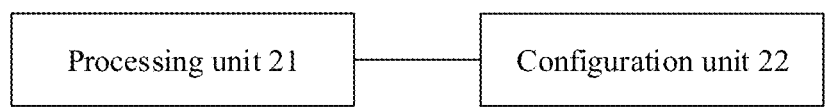
FIG. 2 is a schematic structural composition diagram of a terminal device according to an embodiment of the disclosure.

The embodiment of the disclosure provides a terminal device, which includes a processing unit 21, as illustrated in FIG. 2.

The processing unit 21 is configured to perform at least one of: activating a secondary cell corresponding to a target BWP based on an instruction for activating the target BWP; or deactivating the secondary cell corresponding to the target BWP based on an instruction for deactivating the target BWP.

Furthermore, the terminal device includes a configuration unit 22.

The configuration unit 22 is configured to configure at least one corresponding BWP for the secondary cell, the BWP including at least one downlink BWP.

In the embodiment of the disclosure, the terminal activates a certain configured secondary cell according to a received instruction for activating a certain BWP; and furthermore, the terminal may also determine to deactivate a certain configured secondary cell that has been activated according to a received instruction for deactivating a BWP.

Activating a certain BWP refers to activating a BWP configured on the configured secondary cell, namely multiple BWPs may be configured for the secondary cell, and the activated BWP is any BWP in the multiple configured BWPs.

Deactivating the BWP refers to deactivating the BWP that is configured for the configured secondary cell that has been activated.

The processing unit 21 is configured to determine, based on the instruction for activating the target BWP, whether to activate the secondary cell corresponding to the target BWP.

Activation of the secondary cell corresponding to the BWP and deactivation of the secondary cell corresponding to the BWP will be described below respectively.

In a first case, the processing unit 21 is configured to determine, based on the instruction for activating the target BWP, whether to activate the secondary cell corresponding to the target BWP.

Specifically, the processing unit 21 is configured to: determine, based on the instruction for activating the target BWP, whether the secondary cell corresponding to the target BWP is in an activated state; and if the secondary cell corresponding to the target BWP is not in the activated state, determine to activate the secondary cell and to activate the target BWP for the secondary cell.

In other words, when the terminal device receives an instruction for activating any BWP configured on a certain secondary cell, if the secondary cell is not activated, the terminal activates the secondary cell; and furthermore, any BWP on the secondary cell is also activated.

In a second case, it is determined, based on the instruction for deactivating the target BWP, whether to deactivate the secondary cell corresponding to the target BWP.

Specifically, the processing unit 21 is configured to: when the instruction for deactivating the target BWP is received by the terminal device, determine whether there is a further BWP in the activated state for the secondary cell where the target BWP is located after the target BWP is deactivated; and if there is not the further BWP in the activated state, deactivate the secondary cell where the target BWP is located, and if there is the further BWP in the activated state, not deactivate the secondary cell.

When an instruction for activating a BWP on a certain secondary cell is received by the terminal device, if there is no configured BWP in the activated state for the secondary cell after the BWP is deactivated, the terminal deactivates the secondary cell; and if there is any one or more configured BWPs in the activated state after the BWP is deactivated, the terminal will not deactivate the secondary cell.

In other words, the secondary cell may be deactivated only when there are no other BWPs in the activated state for the secondary cell, otherwise, the secondary cell is kept in the activated state.

As can be seen, with adoption of the above solution, the target BWP may be activated and/or deactivated to control whether to activate and/or deactivate the secondary cell where the target BWP is located. Therefore, it is possible to solve the problem that the terminal may still not work in the secondary cell if the BWP configured for the cell is not activated after the secondary cell is activated, and thus system processing efficiency is improved.

Figure 3:
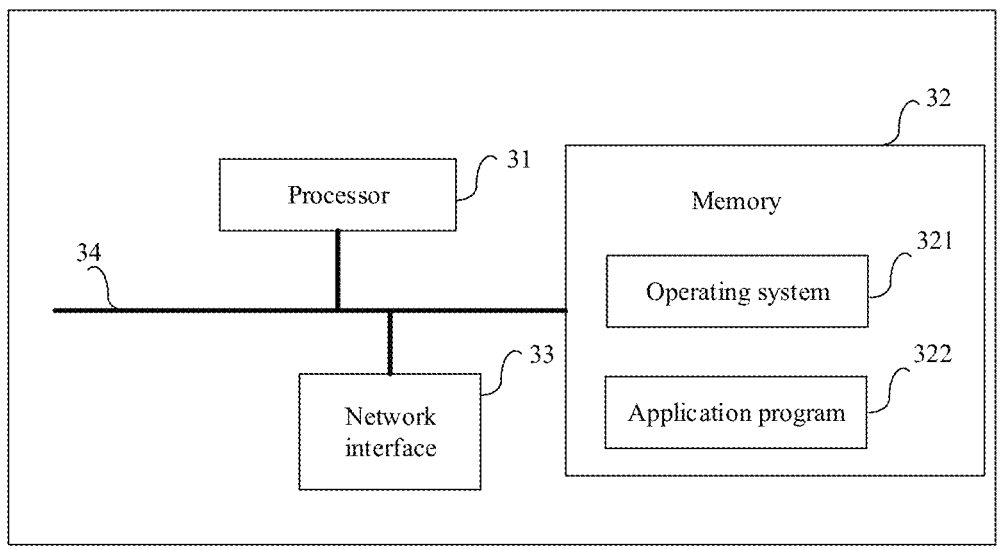
FIG. 3 is a schematic diagram of a hardware architecture according to an embodiment of the disclosure.

The embodiments of the disclosure also provide a hardware architecture of a terminal device, which includes at least one processor 31, a memory 32 and at least one network interface 33, as illustrated in FIG. 3. Various components are connected together through a bus system 34. It is to be understood that the bus system 34 is configured to implement connection and communication between these components. The bus system 34 includes a data bus and further includes a power bus, a control bus and a state signal bus. However, for clear description, various buses in FIG. 3 are denoted as the bus system 34.

It is to be understood that the memory 32 in the embodiment of the disclosure may be a volatile memory or a nonvolatile memory, or may include both the volatile and nonvolatile memories.

In some implementations, the memory 32 stores the following elements, executable modules or data structures, or a subset thereof or an extended set thereof: an operating system 321 and an application program 322.

The processing unit 31 is configured to be capable of performing at least one of: activating a secondary cell corresponding to a target BWP based on an instruction for activating the target BWP; or, deactivating the secondary cell corresponding to the target BWP based on an instruction for deactivating the target BWP.

Furthermore, the terminal device illustrated in FIG. 3 may execute all the steps of the method according to the first embodiment, and elaborations are omitted herein.

The embodiments of the disclosure further provide a computer storage medium having stored thereon computer-executable instructions that, when being executed, implement the steps of the method according to the first embodiment.

When being implemented in the form of software functional modules and sold or used as an independent product, the device of the embodiments of the disclosure may also be stored in a computer-readable storage medium. Based on such an understanding, the technical solutions of the embodiments of the disclosure or a part thereof making contributions to the conventional art may be embodied in essence in the form of a software product, and the computer software product is stored in a storage medium, including a plurality of instructions configured to enable a computer device (which may be a personal computer, a server, a network device and the like) to execute all or part of the method in each embodiment of the disclosure. The storage medium includes: various media capable of storing program codes, such as a USB flash disk, a mobile hard disk, a Read Only Memory (ROM), a magnetic disk or an optical disk and the like. Therefore, the embodiments of the disclosure are not limited to any specific hardware and software combination.

Correspondingly, the embodiments of the disclosure also provide a computer storage having stored thereon a computer program configured to implement the method for cell activation and deactivation according to the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

What is claimed is:

1. A method for cell activation and deactivation, applied to a terminal device, the method comprising at least one of:
   activating a secondary cell corresponding to a target Bandwidth Part (BWP) based on an instruction for activating the target BWP; or
   deactivating the secondary cell corresponding to the target BWP based on an instruction for deactivating the target BWP,
   wherein the method further comprises: before activating the secondary cell corresponding to the target BWP,
   determining, based on the instruction for activating the target BWP, whether to activate the secondary cell corresponding to the target BWP,
   wherein determining, based on the instruction for activating the target BWP, whether to activate the secondary cell corresponding to the target BWP comprises:
   determining, based on the instruction for activating the target BWP, whether the secondary cell corresponding to the target BWP is in an activated state; and
   in a case that the secondary cell corresponding to the target BWP is not in the activated state, determining to activate the secondary cell and to activate the target BWP for the secondary cell.

2. The method of claim 1, further comprising:
   configuring at least one corresponding BWP for the secondary cell, the BWP comprising at least one downlink BWP.

3. The method of claim 1, further comprising: before deactivating the secondary cell corresponding to the target BWP,
   determining, based on the instruction for deactivating the target BWP, whether to deactivate the secondary cell corresponding to the target BWP.

4. The method of claim 3, wherein determining, based on the instruction for deactivating the target BWP, whether to deactivate the secondary cell corresponding to the target BWP comprises:
   when the instruction for deactivating the target BWP is received by the terminal device, determining whether there is a further BWP in the activated state for the secondary cell where the target BWP is located after the target BWP is deactivated; and
   if there is not the further BWP in the activated state, deactivating the secondary cell where the target BWP is located, and if there is the further BWP in the activated state, not deactivating the secondary cell.

5. A terminal device, comprising:
   a memory storing processor-executable instructions; and
   a processor configured to execute the stored processor-executable instructions to perform at least one of:
   activating a secondary cell corresponding to a target Bandwidth Part (BWP) based on an instruction for activating the target BWP; or
   deactivating the secondary cell corresponding to the target BWP based on an instruction for deactivating the target BWP,
   wherein the processor is further configured to execute the stored processor-executable instructions to: before activating the secondary cell corresponding to the target BWP,
   determine, based on the instruction for activating the target BWP, whether to activate the secondary cell corresponding to the target BWP,
   wherein determining, based on the instruction for activating the target BWP, whether to activate the secondary cell corresponding to the target BWP comprises:
   determining, based on the instruction for activating the target BWP, whether the secondary cell corresponding to the target BWP is in an activated state; and
   in a case that the secondary cell corresponding to the target BWP is not in the activated state, determining to activate the secondary cell and to activate the target BWP for the secondary cell.

6. The terminal device of claim 5, wherein the processor is further configured to execute the stored processor-executable instructions to:
   configure at least one corresponding BWP for the secondary cell, the BWP comprising at least one downlink BWP.

7. The terminal device of claim 5, wherein the processor is further configured to execute the stored processor-executable instructions to: before deactivating the secondary cell corresponding to the target BWP,
   determine, based on the instruction for deactivating the target BWP, whether to deactivate the secondary cell corresponding to the target BWP.

8. The terminal device of claim 7, wherein determining, based on the instruction for deactivating the target BWP, whether to deactivate the secondary cell corresponding to the target BWP comprises:
- when the instruction for deactivating the target BWP is received by the terminal device, determining whether there is a further BWP in the activated state for the secondary cell where the target BWP is located after the target BWP is deactivated; and
- if there is not the further BWP in the activated state, deactivating the secondary cell where the target BWP is located, and if there is the further BWP in the activated state, not deactivating the secondary cell.

9. A non-transitory computer storage medium having stored thereon computer-executable instructions that, when being executed by a processor, cause the processor to implement a method for cell activation and deactivation, the method comprising at least one of:
- activating a secondary cell corresponding to a target Bandwidth Part (BWP) based on an instruction for activating the target BWP; or
- deactivating the secondary cell corresponding to the target BWP based on an instruction for deactivating the target BWP,
- wherein the method further comprises: before activating the secondary cell corresponding to the target BWP, determining, based on the instruction for activating the target BWP, whether to activate the secondary cell corresponding to the target BWP,
- wherein determining, based on the instruction for activating the target BWP, whether to activate the secondary cell corresponding to the target BWP comprises:
  - determining, based on the instruction for activating the target BWP, whether the secondary cell corresponding to the target BWP is in an activated state; and
  - in a case that the secondary cell corresponding to the target BWP is not in the activated state, determining to activate the secondary cell and to activate the target BWP for the secondary cell.

10. The non-transitory computer storage medium of claim 9, wherein the method further comprises:
- configuring at least one corresponding BWP for the secondary cell, the BWP comprising at least one downlink BWP.

11. The non-transitory computer storage medium of claim 9, wherein before deactivating the secondary cell corresponding to the target BWP, the method further comprises:
- determining, based on the instruction for deactivating the target BWP, whether to deactivate the secondary cell corresponding to the target BWP.

12. The non-transitory computer storage medium of claim 11, wherein determining, based on the instruction for deactivating the target BWP, whether to deactivate the secondary cell corresponding to the target BWP comprises:
- when the instruction for deactivating the target BWP is received by the terminal device, determining whether there is a further BWP in the activated state for the secondary cell where the target BWP is located after the target BWP is deactivated; and
- if there is not the further BWP in the activated state, deactivating the secondary cell where the target BWP is located, and if there is the further BWP in the activated state, not deactivating the secondary cell.

* * * * *